(12) United States Patent
Dupont et al.

(10) Patent No.: US 8,642,914 B2
(45) Date of Patent: Feb. 4, 2014

(54) ORBITAL CARRIER COMPRISING AT LEAST TWO COMPONENTS IN THE FORM OF SEGMENTS OF A CIRCLE ABLE TO BE CONNECTED TOGETHER; DEVICE FOR BUTT-WELDING PIPES TO FORM A PIPELINE COMPRISING SUCH AN ORBITAL CARRIER

(75) Inventors: Thierry Dupont, Lagny le Sec (FR); Denis Destouches, Dampleux (FR); Cyril Tigien, Morigny Champigny (FR)

(73) Assignee: Serimax, Mitry Mory (FR)

( * ) Notice: Subject to any disclaimer, the term of this patent is extended or adjusted under 35 U.S.C. 154(b) by 787 days.

(21) Appl. No.: 12/293,836

(22) PCT Filed: Mar. 28, 2007

(86) PCT No.: PCT/FR2007/000532
§ 371 (c)(1),
(2), (4) Date: Nov. 17, 2010

(87) PCT Pub. No.: WO2007/110514
PCT Pub. Date: Oct. 4, 2007

(65) Prior Publication Data
US 2011/0049105 A1    Mar. 3, 2011

(30) Foreign Application Priority Data

Mar. 28, 2006 (FR) ..................................... 06 02672
Oct. 5, 2006 (FR) ..................................... 06 08756

(51) Int. Cl.
*B23K 11/02*    (2006.01)
(52) U.S. Cl.
USPC ........................................................ 219/59.1

(58) Field of Classification Search
USPC ........ 219/59.1, 60 A, 60 R, 61, 101, 102, 104; 228/212
See application file for complete search history.

(56) References Cited

U.S. PATENT DOCUMENTS

| | | | |
|---|---|---|---|
| 3,102,187 A * | 8/1963 | Coscia ........................ | 219/60 A |
| 4,145,593 A | 3/1979 | Merrick et al. | |
| 4,336,436 A | 6/1982 | Dubovetsky et al. | |
| 4,363,954 A | 12/1982 | Rinaldi | |
| 5,171,954 A * | 12/1992 | Rinaldi ........................... | 219/61 |
| 2002/0153406 A1 | 10/2002 | Vermaat | |

FOREIGN PATENT DOCUMENTS

| | | |
|---|---|---|
| GB | 1465959 | 3/1977 |
| JP | 55114494 | 9/1980 |

* cited by examiner

*Primary Examiner* — Brian Jennison
(74) *Attorney, Agent, or Firm* — Oblon, Spivak, McClelland, Maier & Neustadt, L.L.P.

(57) ABSTRACT

The invention relates to an orbital carrier (2) for a device for butt-welding pipes (C, C) to form a pipeline, said device comprising at least one welding carriage (1) supporting at least one welding head (6) which has at least one welding torch, said orbital carrier (2) surrounding the pipes (C, C) to be welded and being designed to enable positioning and movement in the plane of the joint between the pipes (C, C) of said welding carriage or carriages (1), and said orbital carrier (2) also being movable translationally along the pipeline as it grows. The invention consists in the fact that said orbital carrier (2) consists of at least two components (20) in the form of segments of a circle able to be connected together to form the orbital carrier (2) around the pipes (C, C) during a welding phase and also to allow said orbital carrier (2) to be opened, at least at the top, to allow it to pass an obstruction on the outside of the pipe (C, C). Application: the welding of pipes (C, C).

12 Claims, 4 Drawing Sheets

ORBITAL CARRIER COMPRISING AT LEAST TWO COMPONENTS IN THE FORM OF SEGMENTS OF A CIRCLE ABLE TO BE CONNECTED TOGETHER; DEVICE FOR BUTT-WELDING PIPES TO FORM A PIPELINE COMPRISING SUCH AN ORBITAL CARRIER

The present invention concerns an orbital carrier of a device for orbital butt-welding of pipes forming a pipeline designed to transport liquids or gases.

On construction of the pipeline, the pipes are arranged end-to-end and joined by welding. This welding operation can be carried out manually or by means of automated welding devices. From the standpoint of being able to carry out the welding operation as quickly as possible, the automated devices are preferred and generally comprise at least one welding carriage supporting at least one welding head that can be moved orbitally along the plane of the joint between the pipes.

The welding device also contains means of positioning and/or means of movement of the electrodes or electrodes along the bevel between the pipes to be welded, those means notably making it possible to orbitally move and guide the carriage supporting the welding head along the welding joint plane. Such means can notably consist of a so-called orbital carrier surrounding the pipes and along which the carriage is moved around the pipes to be welded. Such circular carrier is further movable along the pipeline formed up to the new link between the pipes to be welded.

Such an orbital carrier is, therefore, designed to enable, on the one hand, the positioning and movement of the welding carriage or carriages along the bevel between the pipes to be welded and, on the other hand, for its translation along the pipeline formed, in order to be positioned at the joint plane of two new pipes to be welded.

Although this type of orbital carrier makes it possible, notably, to use several welding carriages for welding between the pipes, it also has a disadvantage, inasmuch as it is not always usable on the pipelines to be formed.

In fact, the pipeline built can contain on its periphery components such as deposit head, T-shaped fitting, valves and the like, which are preinstalled on the pipes to be welded and encumber the periphery of the pipeline, particularly at the upper part of said pipeline and possibly also on the sides. It was then realized that the orbital carrier could be blocked on movement along the pipeline because of the presence of those components. It was, therefore, then necessary to resort to disposable welding devices.

As a variant, opening of the orbital carrier was proposed in order to move it. It was thus proposed in U.S. Pat. No. 4,145,593 that a welding station be provided for pipes containing a path system for the welding device, consisting of two semi-paths resembling a "clamp" suspended above the pipe to be formed. However, each clamp part surrounds said pipe, but there is no closing of said clamp in order to form a support all around the plane of the joint to be welded. Such a device is otherwise suspended from a rail above the pipe to be welded.

In U.S. Pat. No. 3,102,187, an orbital carrier is described, consisting of two arc-shaped parts connected at one end around a pivot point situated at the top of the pipe being formed like a clamp. On pivoting of the two parts, the orbital carrier opens at the bottom of the pipe being formed. Such an orbital carrier forms part of a tractor assembly movable along the pipe, but is mainly placed at the top of said pipe. In order to pass from one bevel to be welded to another, the orbital carrier is opened by pivoting of the two circular segments. Thus, in that device as well, the orbital carrier is moved at the top of the pipe and is opened and closed at the bottom of the pipe being formed.

In U.S. Pat. No. 4,336,436, an orbital welding carrier is also described, which is suspended from the top of the pipe and consists of two circular segment parts separable from one another by pivoting around a hinge point situated at the top of the said pipe being formed, the carrier therefore opening again at the bottom.

Though surrounding the pipeline being formed in order to guide at least one welding torch and opening out, these carriers cannot be used on pipes having an obstruction mainly at the top, as is often the case in the present prefabricated pipes.

Furthermore, it is not possible to envisage an enlargement of the diameter of the orbital carrier making it possible to pass the obstacles, for it would then be necessary to lengthen the arms bearing the welding head, which would result in a lack of precision in the welding carried out.

Thus, in JP 55 114494, an orbital carrier was proposed for a welding device which surrounds the joint plane and is connected to a traveling platform making it possible to move said orbital carrier along the pipe being formed. However, this orbital carrier is relatively far from the joint plane and, therefore, maintains a certain distance from it. Consequently, there is a risk of imprecise positioning of the welding torch. The carrier is, furthermore, circular and consists of two parts linked to one another around a pivot point placed at the top of the pipe, one of the parts being mounted fixed on the traveling platform situated at the top of the pipe. Consequently, opening of the carrier generates space only on one side. Therefore, if an obstruction occurs on both sides and/or on top of the pipe being formed, such a device is unusable.

To overcome these difficulties, the present invention is intended to offer an orbital carrier of a butt-welding device for pipes, which enables the most precise possible welding and which can be moved along the pipeline formed, regardless of the obstruction, on the surface of said pipes, notably at the top of the pipes, said obstruction being roughly situated on the upper half of the periphery of said pipe.

For that purpose, the object of the invention is a so-called orbital carrier of a butt-welding device for pipes in order to form a pipeline, said device containing at least one welding carriage supporting at least one welding head having at least one welding torch, said orbital carrier surrounding the pipes to be welded and being designed to enable positioning and movement along the plane of the joint between the pipes to be welded by said welding device, and said orbital carrier being further translatable along the pipeline being formed, characterized in that said orbital carrier consists of at least two components in the form of circular segments designed to be connectable to one another in order to form the orbital carrier around the pipes to be welded during a welding phase and also to make possible the opening of said orbital carrier at least at the top in order to pass an obstruction situated on the periphery of a pipe.

The opening of the orbital carrier thus advantageously enables it to pass the obstacles present at least at the top of said pipe, that possibility of opening preferably being used only when an obstacle has to be overcome. Thus, if an obstacle should occur on the upper periphery of the pipe, it is sufficient to open the orbital carrier at least at the top in order to be able to pass the obstacle, and once the obstacle is passed, the orbital carrier then preferably as close as possible to the periphery of the pipe is closed.

An orbital carrier according to the invention, therefore, makes it possible to preserve all the advantages associated with an automated welding device moving along the pipeline being formed, containing at least one welding carriage, and preferably two to eight welding carriages, moving along said orbital carrier in order to weld the pipes together, and even for pipes having preinstalled components notably on their upper periphery.

The welding device borne by an orbital carrier according to the invention, which is as close as possible to the pipe being formed, can thus advantageously be moved along the pipeline being formed by simple conveyance of the said orbital carrier by the barge along said pipeline, but, in addition, the orbital carrier of the invention, which can be opened at least at the top of said pipe, makes possible passage of the pipes which can sometimes present a peripheral obstruction usually at the top of the pipe, which was not the case with the carriers of the state of the art. The orbital carrier according to the invention is borne by carrier means translatable along the pipeline being formed.

According to a first preferred embodiment of the invention, the orbital carrier consists of two semicircular parts, connectable to each other to form the orbital carrier around the pipes to be welded during a welding phase and separable from each other to allow the opening of the orbital carrier, the two semicircular parts then being translatable along the pipeline being formed, spaced apart from the latter, notably in order to pass an obstruction on the periphery of the pipe.

According to a preferred variant application of the invention, opening and closing are carried out in a plane perpendicular to the plane in which the pipeline being formed extends. Thus, when the pipeline being formed extends in a horizontal plane, each semi-circular part is positioned with its free ends at the top and at the bottom of the pipes to be welded and the two parts are thus separable on each side of the pipeline being formed. It is thus freed from the space at the top of the pipe, but also actually on the sides.

Each semicircular part containing means of guiding and moving the welding carriage or carriages, it is then indispensable for the link between the two parts that are to form the orbital carrier to be perfect, the welding carriage or carriages not being disturbed in their movement at the link between the parts. Each semicircular part is thus provided at its end not only with means of connection and of locking, by way of option, making it possible to close the orbital carrier, but, in addition, means are provided to enable perfect positioning and alignment of the parts in relation to each other, such as supplementary means of guidance.

The two semicircular parts are also preferably rotatable, so that once the orbital carrier is opened by separation of the two semicircular parts, the latter are driven in rotation to extend along the pipe. The spacing necessary between the two parts is thus advantageously limited.

According to a second preferred embodiment of the invention, the orbital carrier consists of at least two parts in the form of circular segments, one of the so-called fixed segments receiving, pivot mounted at least at one of its ends, one end of another so-called movable segment, the opposite end of the so-called movable segment being at least connectable to the free end of the so-called fixed segment in order to form the orbital carrier and separable from said free end of the fixed segment in order to open said carrier at least at the upper part of said carrier on pivot drive of the said movable segment toward the outside of the orbital carrier. The swivel pin between the two circular segments is positioned so that pivoting of the movable circular segment opens the carrier at the top of the pipe and thus frees at least the upper part of the pipe, which generally has an obstruction.

Thus, in order to pass from the closed position in welding phase to an open position, the movable circular segment is pivoted on the fixed segment.

According to a still more preferred variant application, the moving support contains at least three circular segments, a so-called fixed circular segment being positioned so as to constitute the lower part of the orbital carrier lodged under the pipeline being formed and the end of a so-called movable circular segment being pivot mounted on each of the ends of the said fixed circular segment, their opposite ends being connectable to each other, preferably in the upper part of the orbital carrier, above the pipeline being formed, in order to form and close the orbital carrier and separable from each other in order to open said carrier at the top by pivot drive of the two movable circular segments in relation to the fixed circular segment toward the outside of the orbital carrier.

It can also be preferably arranged for the fixed circular segment to consist of two segments respectively separated from each other on translation on both sides of the pipeline. This embodiment advantageously facilitates the placement and withdrawal of the orbital carrier and can also make it possible to further free the ends of the pipe, if necessary.

Each part in the form of a circular segment containing the means of guidance and movement of the welding carriage or carriages, it is then indispensable for the link between the two parts that are to form the orbital carrier to be perfect, the welding carriage or carriages not being disturbed in their movement at the link between the parts. Each part in the form of a circular segment is thus provided at least at its end not only with means of connection and of locking, by way of option, making it possible to close the orbital carrier, but, in addition, means are provided to enable perfect positioning and alignment of the parts in relation to each other, such as supplementary means of guidance upon their connection by pivoting. The means of pivoting are likewise designed to perfectly position and align the circular segments in relation to each other.

The invention will now be described more in detail with reference to the drawing in which.

Figure 1:
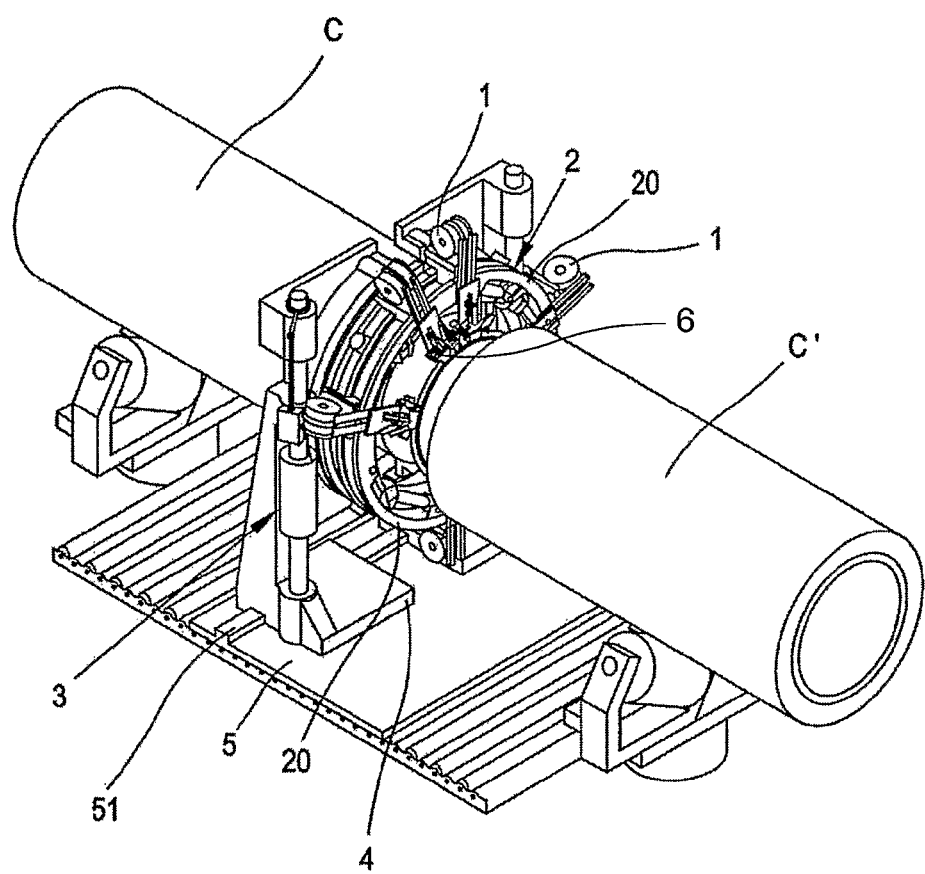
FIG. 1 represents a view in front side perspective of a welding device containing an orbital carrier according to the first embodiment of the invention, in production phase.
Figure 2:
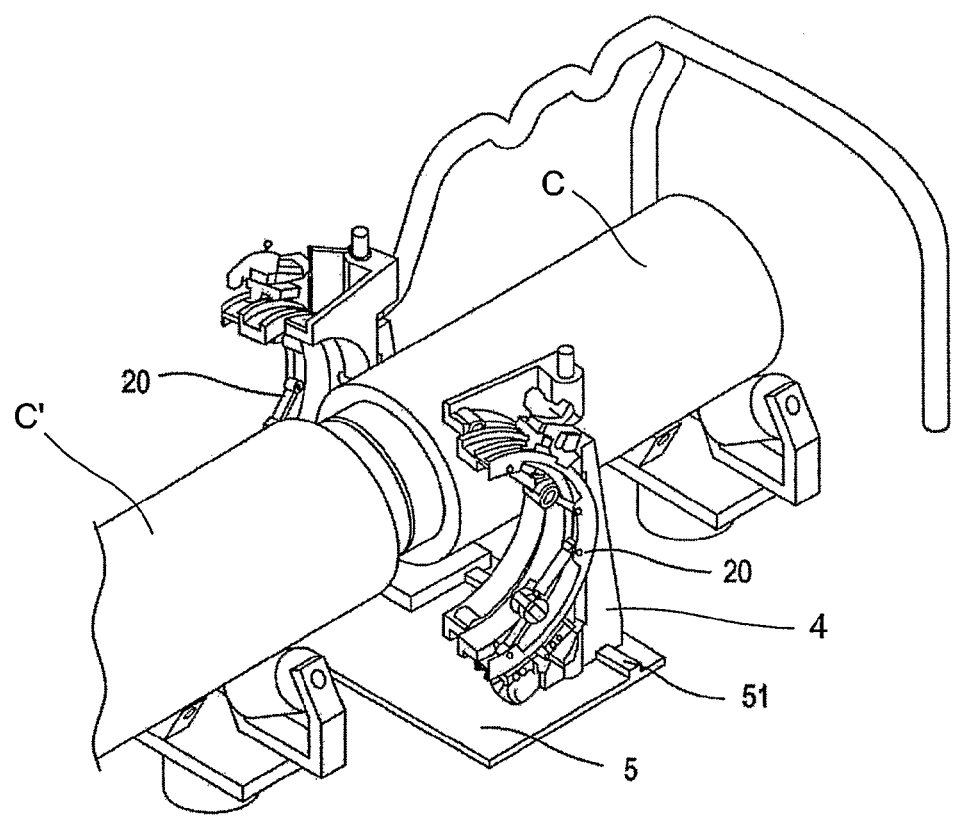
FIG. 2 represents a view in rear side perspective of the welding device of FIG. 2 after opening of the orbital carrier in order to pass obstacles on the periphery of the pipes.
Figure 3:
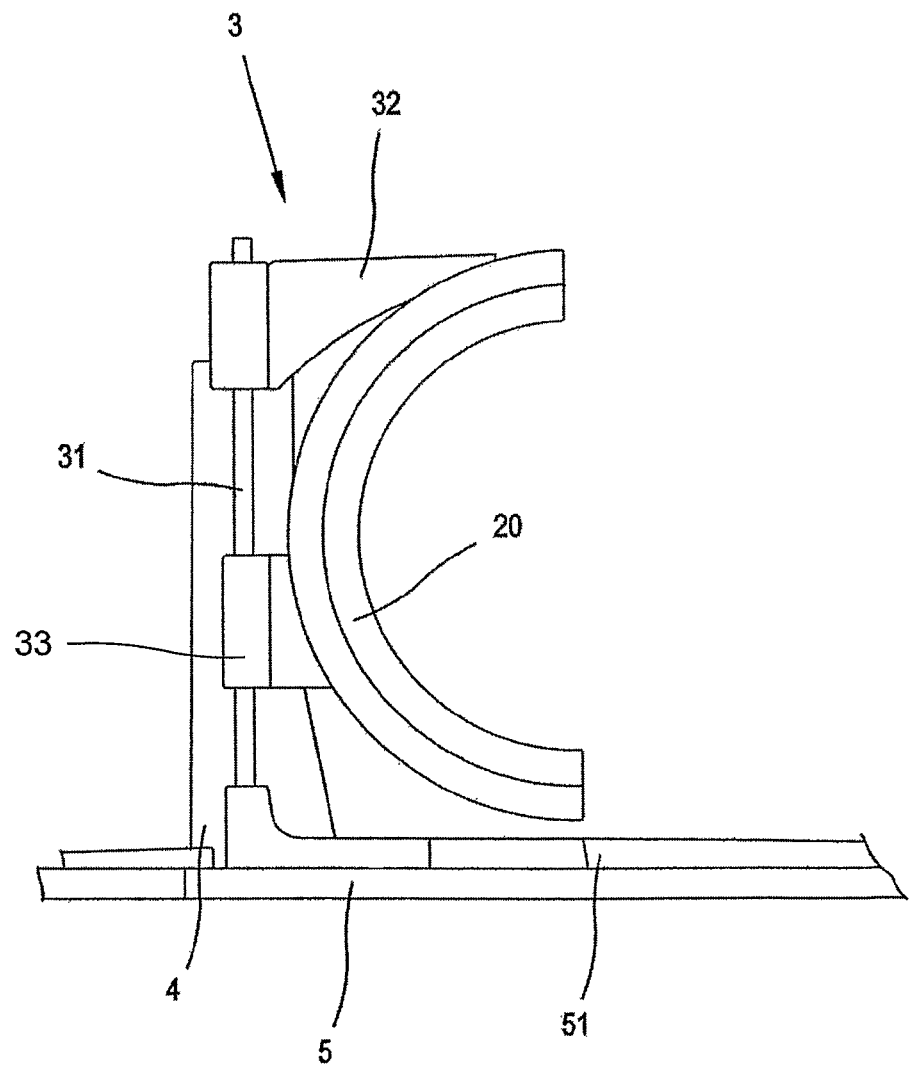
FIG. 3 represents a plan view of a semicircular part constituting the orbital carrier.

The welding device represented in the figures contains several welding carriages 1 respectively bearing at least one welding head 6 equipped with at least one welding torch. That welding device makes welding possible between the pipes to be welded in order to form a pipeline extending in a horizontal plane.

To automate welding, the welding carriages 1 are moved along guide rails provided on an orbital carrier 2, 7 surrounding the pipes C, C' to be welded at their joint plane. These welding carriages 1 are radially movable toward the pipes C, C' in order to carry out welding and the welding heads 6 are lifted once welding is completed.

This orbital carrier 2 consists of two semicircular components 20 connectable to each other perfectly aligned, but also separable from each other.

Thus, each component 20 is borne by a bracket 3 consisting of an upright 31 and a crosspiece 32, at the end of which the upper part of the semicircular component 20 is fastened. The appreciably lower part of the component 20 is also connected to the upright 31 by a part 33. The upright 31 is pivot-mounted on a base 4 which in turn is mounted on bearing means such as a pedestal 5. The pedestal 5 is designed to extend under the pipes to be welded C, C' perpendicular to said pipes and has a guide rail 51 also extending perpendicular to the longitudinal axis of said pipes C, C'. Each base 4 bearing a bracket 3 is mounted on that guide rail 51, movable along said rail 51, on both sides of the pipes.

The bearing means could also consist of means extending above the pipes to be welded, such as bridge, to which the orbital carrier according to the invention would be "suspended," or of any other appropriate bearing means.

In the course of the welding phase the orbital carrier 2 consists of the two semicircular components 20 connected to each other so that the welding carriages can be guided along the orbital carrier 2 in order to carry out welding (see FIG. 1).

Once the welding phase between two pipes C, C' is completed, the welding device should be brought opposite a new joint plane between two pipes to be welded C', C". When the pipe C' whose end has just been welded to the pipeline being formed has no peripheral obstruction, the welding device is simply conveyed by means of the pedestal 5 along said pipe C' to the new joint plane between the pipe C' and the new pipe C''' to be welded.

If the pipe C' has a peripheral obstruction associated with the presence of valves, for example, in order to move the welding device, the orbital carrier 2 is opened, that is, the connection between the two components 20 is unlocked and they are parted by the separation of said components 20 on both sides of the pipes C, C' already welded. That separation of the components 20 is achieved by moving the bases 4 over the guide rail 51 of the pedestal 5 in the direction of a space between the pipes.

Once the components 20 are separated from the pipes C, C' welded, each bracket 3 is pivoted on the base 4, so that each component 20 extends along the pipes C, C', which limits the obstruction of the assembly and the separation of the components 20. The orbital carrier 2 thus opened is then moved along the pipeline being formed in order to bring it beyond the peripheral obstruction encountered due to the presence of valves.

Once the obstacle is passed, the brackets 3 are again pivoted on the base 4 in order to bring the components 20 opposite each other on both sides of the pipes to be welded C', C''' and the bases 4 are moved over the guide rail 51 of the pedestal 5 in order to connect the components 20, that is, to close the orbital carrier 2 in order to proceed to the welding phase by means of appropriate connecting and locking means provided at each end of the components 20. The welding device is then moved in the usual manner.

To guarantee perfect alignment of the components 20, supplementary means of guidance are preferably provided on each of them, making possible an aligned positioning of the components 20, once they are connected to each other. At least one male guide unit and at least one female guide unit can thus be provided opposite each end of the semicircular part 20.

Figure 4:
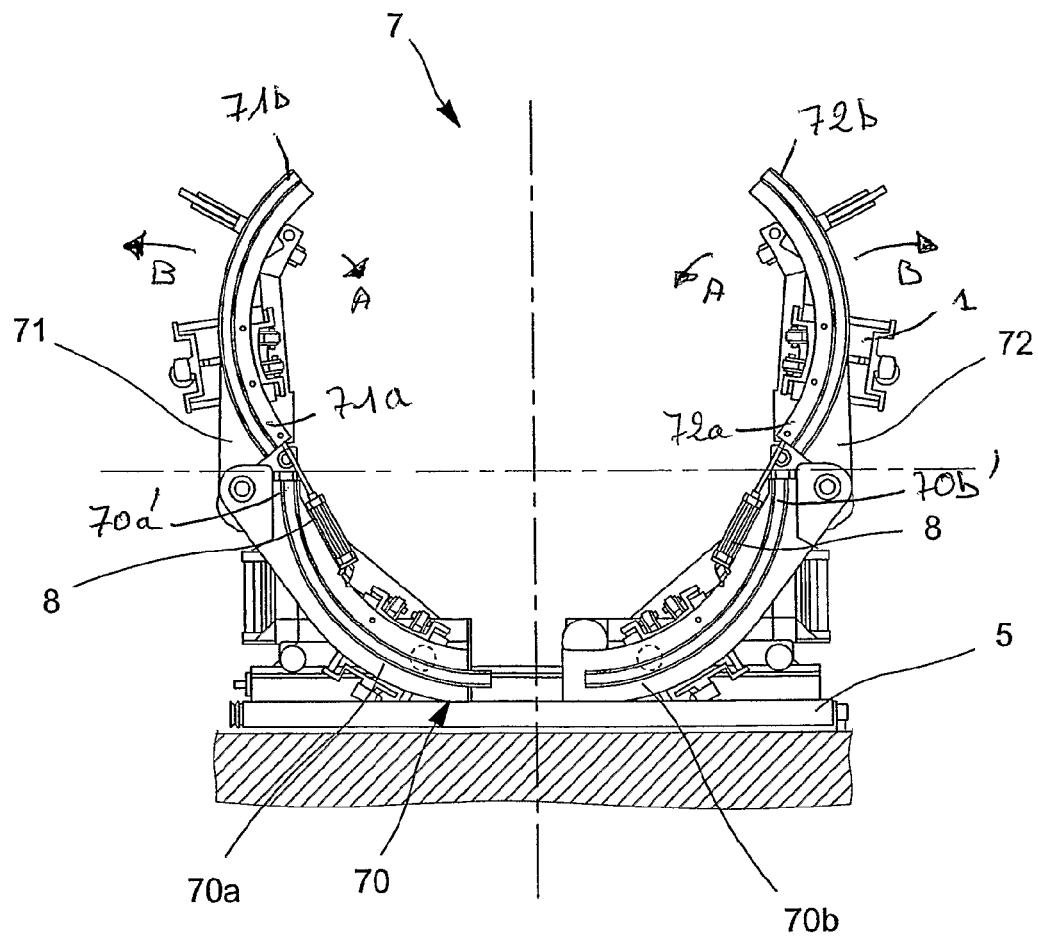
FIG. 4 represents a plan view of an orbital carrier according to the second embodiment of the invention.

As can be seen in FIG. 4, the orbital carrier 7 consists of three parts in the form of a circular segment which, when connected to one another, form said orbital carrier 7. A first part, called fixed circular segment 70, is mounted on bearing means such as the pedestal 5, which is designed to extend under the pipes to be welded C, C' perpendicular to said pipes. The two other parts are called movable circular segments 71 and 72.

At each end 70a', 70b' of the fixed circular segment 70, one end 71a, 72a of a movable circular segment 71, 72 is pivot-mounted, the opposite end 71b, 72b of each movable segment 71, 72 being connectable to one another.

At the ends 70a', 70b' of the fixed segment 70 pivot drive means of a movable circular segment 71, 72 are provided between a closed position of the orbital carrier 7 and an open position of the latter in the upper part of which the movable segments 71, 72 have been separated from each other by pivot drive toward the outside (arrow A) of the orbital carrier, as can be seen in FIG. 4. The location of the pivot pin of the segments 71 and 72 on the ends 70a' and 70b' can be advantageously chosen according to the space freed around the pipe on the opening of the carrier 7 that it is desired to obtain. In FIG. 4, the pivot pins are situated roughly diametrically opposite the mid-height of the carrier 7.

These means enabling pivot drive can, notably, consist of jacks 8.

In addition, the pedestal 5 can once again have a guide rail 51 also extending perpendicular to the longitudinal axis of said pipes C, C'. Mounted on that guide rail 51, movable along said rail 51, on both sides of the pipes, are two circular segments 70a and 70b which, connected to one another, form the so-called fixed circular segment 70.

In the course of the welding phase the orbital carrier 7 consists of three parts in the form of segments 70, 71 and 72, connected to one another, or four parts 70a, 70b, 71 and 72, respectively equipped with guide means, so that the welding carriage can be guided along the orbital carrier 7 in order to carry out welding.

It is to be noted that the embodiment represented in FIG. 4 could also be envisaged as a variant of the embodiment of FIG. 1, in which each component 20 would consist of two parts 70a, 71 and 70b, 72.

Once the welding phase is completed between two pipes C, C', the welding device should be brought opposite a new joint plane between two pipes to be welded C', C". When the pipe C', one end of which has just been welded to the pipeline being formed, has no peripheral obstruction, the welding device is simply driven in translation by means of the pedestal 5 along said pipe C' up to the new joint plane between the pipe C' and the new pipe C''' to be welded.

If the pipe C' has a peripheral obstruction associated with the presence of valves, for example, in order to move the welding device, the orbital carrier 7 is opened, that is, the connection between the two movable circular segments 71, 72 is unlocked and they are separated by the pivot drive of said movable circular segments 71, 72 from the fixed circular segment 70 in the direction of a space (arrow A) between said parts 71, 72 outward on both sides of the pipes C, C' already welded.

Once the parts 71, 72 are separated from the pipes C, C' welded, the orbital carrier 7 thus opened is moved along the pipeline being formed in order to bring it beyond the encountered peripheral obstruction associated with the presence of valves.

Once the obstacle is passed, the circular segments 71, 72 are again pivot driven (arrow B) in relation to the fixed segment 70 in order to bring their ends 71b, 72b opposite one another at the top of the pipes to be welded C', C''' in order to connect the parts 71, 72, that is, to close the orbital carrier 7 in order to proceed to the welding phase by means of appropriate connecting and locking means provided at each end of the parts 71, 72. The welding device can then be moved in the usual manner along the orbital carrier 7.

To guarantee perfect alignment of the segments 70, 71 and 72, supplementary means of guidance are preferably provided on each of said segments, making possible an aligned positioning once they are connected to each other.

The invention is, of course, not limited to the working example described, but covers all possible variants within the scope of protection of the claims.

The invention claimed is:

1. A welding device comprising:
   a pedestal extending under a pipeline being formed, the pedestal being movable along said pipeline;
   two half-circle components slidably mounted on said pedestal, each half-circle component being disposed on one respective side of the pipeline; and
   a welding carriage slidably mounted on one of the two half-circle components, the welding carriage including at least one welding head and at least one welding torch equipped to said at least one welding head, wherein
   said two half-circle components are slidable between a first relative position and a second relative position,
   the two half-circle components engage one another in said first relative position and the two half-circle components are spaced apart from each other in said second relative position,
   the two half-circle components form an orbital carrier in said first relative position, said orbital carrier surrounding the pipeline, and the two half-circle components are away from the pipeline in said second relative position,
   the pedestal being translatable relative to and along the pipeline irrespective of whether the two half-circle components are in the first relative position or in the second relative position.

2. A welding device according to claim 1, wherein said two half-circle components are slidable perpendicularly to the pipeline being formed.

3. A welding device according to claim 1, wherein said two half-circle components are also rotatably mounted on said pedestal.

4. A welding device according to claim 2, wherein said two half-circle components are also rotatably mounted on said pedestal.

5. A welding device according to claim 1, further including at least one bracket slidably mounted on the pedestal, wherein at least one of said two half-circle components is mounted on said at least one bracket.

6. A welding device according to claim 5, wherein said at least one of said two half-circle components is pivotally mounted on said at least one bracket.

7. A welding device according to claim 5, wherein said at least one bracket includes a base slidably mounted on said pedestal, an upright piece mounted on said base, wherein said at least one of the two half-circle components is fastened to said upright piece.

8. A welding device according to claim 7, further including a guide rail fastened to said pedestal and said guide rail extending perpendicular to the pipeline being formed, wherein said base engages said guide rail.

9. A welding device according to claim 7, wherein said upright piece is pivotly mounted on said base.

10. A welding device according to claim 1, wherein at least one of said two half-circle components comprises two quarter-circle components pivotly mounted on each other, said two quarter-circle components are movable between a first relative position and a second relative position, and
    the two quarter-circle components engage one another in said first relative position and the two quarter-circle components are spaced apart from each other in said second relative position.

11. A welding device according to claim 1, further including locking means equipped to said two half-circle components, wherein said locking means are actuatable when the two half-circle components are in said first relative position, and said locking means locks the two half-circle components in said first relative position.

12. A welding device according to claim 1, wherein said pedestal is movably installed on a barge.

* * * * *